US006898214B1

(12) United States Patent
Sinsky et al.

(10) Patent No.: US 6,898,214 B1
(45) Date of Patent: May 24, 2005

(54) TECHNIQUE FOR MONITORING SONET SIGNAL

(75) Inventors: Jeffrey Sinsky, Monmouth, NJ (US); Weiguo Yang, Middlesex, NJ (US)

(73) Assignee: Lucent Technologies Inc., Murray HIll, NJ (US)

( * ) Notice: Subject to any disclaimer, the term of this patent is extended or adjusted under 35 U.S.C. 154(b) by 628 days.

(21) Appl. No.: 09/803,301

(22) Filed: Mar. 9, 2001

(51) Int. Cl.$^7$ .............................................. H04L 12/28
(52) U.S. Cl. ....................... 370/907; 370/903; 370/469; 700/55; 710/62; 359/308; 398/21; 398/43; 398/51; 398/58; 398/71; 708/300; 708/309; 708/311; 708/312; 708/317
(58) Field of Search .............................. 398/51, 58, 21, 398/71, 43, 85; 370/469, 903, 907; 710/62; 700/55; 359/308; 708/300–323; 706/22

(56) References Cited

U.S. PATENT DOCUMENTS

| | | | | |
|---|---|---|---|---|
| 5,153,763 A | * | 10/1992 | Pidgeon ....................... | 398/71 |
| 5,262,883 A | * | 11/1993 | Pidgeon ....................... | 398/71 |
| 6,075,628 A | * | 6/2000 | Fisher et al. .................. | 398/21 |
| 6,334,219 B1 | * | 12/2001 | Hill et al. .................... | 725/106 |

OTHER PUBLICATIONS

D. T. Kong, "2.488 Gb/s SONET Multiplexer/Demultiplexer With Frame Detection Capability", *IEEE Journal on Selected Areas in Communications*, vol. 9, No. 5, pp 726–732 (Jun. 1991).

G. Cariolaro et al., "Signal Theory For SONET STM–1", *SBT/IEEE International Telecommunications Symposium, Its '90 Symposium Record, Rio De Janeiro, Brazil*, Sep. 3–6, 1990, pp 26–32.

X. A. Shen et al., "Optical Header Recognition By Spectro-holographic Filtering", *Optics Letters*, vol. 20, No. 24, pp 2508–2510 (Dec. 15, 1995).

W. Yang et al., SONET Framing Recognition Using Modulation Domain Analysis, *IEEE Photonics Technology Letters*, vol. 13, No. 10, pp 1127–1129 (Oct. 2001).

W. Yang et al., "Radio–Frequency Spectral Analysis for SONET Framing Recognition and Performance Monitoring", *Journal of Optical Networking*, vol. 1, No. 2, pp 74–79 (Feb. 2002).

* cited by examiner

*Primary Examiner*—Anthony Knight
*Assistant Examiner*—Thomas Pham
(74) *Attorney, Agent, or Firm*—David A. Sasso

(57) ABSTRACT

A technique for performance-monitoring of a standard SONET signal involves first converting the optical signal to an electrical signal, removing in the framing signal time slot the framing signal for leaving only the framing signal noise in such time slot, and separating the framing signal noise from the data signal for viewing as a measure of the quality of the SONET signal.

11 Claims, 1 Drawing Sheet

TECHNIQUE FOR MONITORING SONET SIGNAL

FIELD OF THE INVENTION

This invention relates to a technique for performance monitoring of the standard SONET (synchronous optical network) signal by examining the quality of its framing signal.

BACKGROUND OF THE INVENTION

The SONET standard defines a field set of criteria encompassing data rates and formats, network segments, network elements and the other factors important for ensuring end-to-end performance of an optical communication network. The current SONET system relies on individual bits in the SONET frame headers to extract performance monitoring indicators such as loss of frame (LOF). Such extraction is relatively easy in systems in which the regeneration of the optical signal is periodically converted to an electrical signal for amplification and then regenerated as an optical signal. However in all-optical regeneration systems, individual bits are no longer available at section or line network elements, such as all-optical regenerators or all-optical cross-connects. This absence of individual bits complicates the problem of performance monitoring of all-optical systems. The present invention seeks an improved technique for performance monitoring of optical communication systems. Such monitoring is important to insure healthy network operation.

SUMMARY OF THE INVENTION

The present invention provides an improved technique for performance monitoring of an optical communication system that complies with a SONET-type standard. More particularly, the present invention involves the spectral analysis of the SONET signal to eliminate therefrom the framing signal that serves to identify the start of each frame of the signal and to use the energy remaining in its time slot as performance-measuring indicators of the signal. The use of spectral analysis of the SONET traffic obviates the need for accessing individual bits of the signal, which greatly simplifies the process of performance monitoring.

The present invention is based on the recognition that the SONET framing sequence has a spectral structure different from that of the rest of the signal, which is generally much more random. In particular, modulation domain analysis can successfully recognize this difference and show the transition between the framing signal and the rest of the signal as a function of time. In this way, the SONET framing pulses are extracted directly from the SONET traffic without accessing actual individual data bits.

In particular, when there is removed the framing signal, there remains in its time slot the noise that has accumulated in such time slot. The framing signal for OC-N traffic is a periodic sequence of N bytes of A1 and N bytes of A2. This noise will be a measure of the quality of the framing signal and should indicate any loss of frame. This noise will generally be of a lower power level than the remainder of the signal that includes the data pulses so that the time slot of the detected framing signal noise can be readily recognized by inspection for use in monitoring of the quality of the framing signal. To facilitate such inspection the signal now available can first be passed through a square law detector.

The invention will be better understood from the following more detailed description taken in conjunction with the accompanying drawing.

DETAILED DESCRIPTION

Figure 1:
FIG. 1 shows a block schematic of apparatus for recovery from the optical carrier signal of a SONET system for extracting the framing signal in accordance with the invention.

In the system 10 shown in FIG. 1, the optical carrier (OC) received is first supplied to a standard optoelectronic apparatus 12, such as a PIN diode, that converts the optical signal to an electrical signal. This signal is then supplied to a notch filter 14 designed to filter out the repetitive framing signal while passing the noise associated with it remaining in its time slot at lower power as well as the higher random data signal power.

The output of the filter 14 is now supplied to a square law detector 16 which further discriminates between the low power framing signal noise and the high power data signal so that, in a visual display of the result, there is readily recognized the framing signal noise and its level determined. Remedial action can then be taken when the framing signal noise is detected to be above some specified level.

Figure 2:
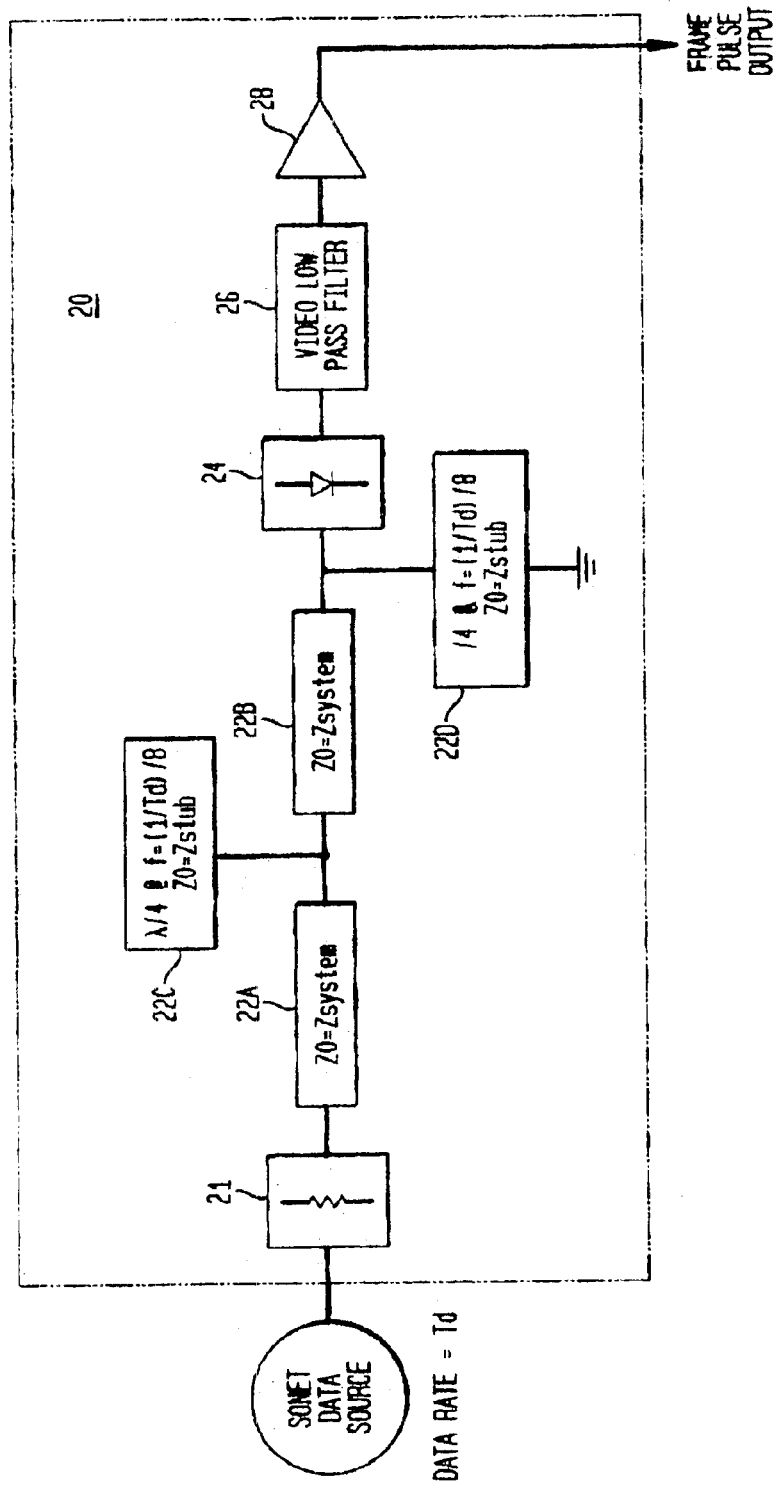
FIG. 2 shows in schematic form the basic elements of an exemplary embodiment of the apparatus of FIG. 1.

In FIG. 2 there is shown in greater detail within the broken line 100 an exemplary embodiment 20 of the electronic circuitry for treating the optical SONET signal after it has been converted to its electronic form.

In particular, the exemplary circuitry 20 includes a 50 ohm termination 21, which is supplied with the converted electrical input and which is included to minimize the effect of any reflections in the circuitry. This is followed by a low-pass notch filter 22 comprising, for example, two 50 ohm lengths of transmission 22A, 22B line and two one-quarter wavelength stubs 22C, 22D, of which 22C is open-ended and 22D shorted, to form a notch filter that passes the framing signal noise and the data payload, but blocks the framing signal. To this end, the filter is designed to generate notches at $$\frac{n}{8}\left(\frac{1}{T_D}\right)$$

where n is 1 . . . 8, and $T_D$ is the data rate of the OC traffic. The filter output is then supplied to a diode 24 that serves as a squaring circuit for providing a low voltage-signal for low signal-power but supplying a relatively higher voltage for higher powers to provide increased discrimination between low and high powers. This facilitates distinguishing the relatively high data-power from the relatively low framing-signal noise power. Now there is included a video low-pass filter 26 that passes selectively the video framing signal noise voltage, which, after amplification in amplifier 28, can be viewed for use in monitoring the operation.

It should be understood that the embodiment described is merely illustrative of the general principles involved; other embodiments should be feasible without departing from the spirit and scope of the invention.

What is claimed is:

1. Apparatus for performance-monitoring of a synchronous optical network standard signal comprising:

means supplied with the standard optical signal for converting the standard optical signal to an electrical signal;

means for separating from said electrical signal the framing signal portion thereof and leaving in its time slot the noise that was on the framing signal; and means for separating selectively for inspection such noise from the data power for use as a measure of the quality of the standard optical signal.

2. The apparatus of claim 1 in which the means for separating the noise from the data includes a squaring circuit for increasing the discrimination between the relatively low noise power and the relatively high data power, and a low pass filter circuit for passing selectively the noise power to a display for viewing.

3. The apparatus of claim 1 in which the means for separating the framing signal from its noise is a notch filter.

4. The apparatus of claim 2 in which the squaring circuit is a diode.

5. The apparatus of claim 2 in which the means for separating the framing signal power from the noise power in its time slot is a notch filter.

6. The apparatus of claim 3 in which the framing signal is separated from the noise in its time slot by a low pass filter including two 50 ohm lengths of transmission line and two one-quarter wavelength stubs of such a transmission line, of which one is shorter and the other open-ended.

7. A process for performance monitoring of a SONET standard signal comprising the steps of converting the signal into an electrical signal, separating from said electrical signal the framing signal in a manner to leave the noise in the framing signal time slot and the data power essentially undisturbed, and displaying the noise power in the framing time slot of the separated signal.

8. A process for performance-monitoring of a SONET standard signal comprising the steps of converting the signal into an electrical signal, separating from said electrical signal the framing signal in a manner to leave the noise in the framing signal time slot and the data power essentially undisturbed, and displaying the noise power in the framing time slot of the separated signal;

wherein before its display the separated signal is treated to increase the difference in the level of the noise power in the framing slot and the data power of the signal.

9. Apparatus for monitoring a SONET signal comprising:

means for separating the signal power in a framing portion of the SONET signal from noise power in the framing portion;

means for comparing the noise power in the framing portion to the signal power in a data portion of the SONET signal to determine a measure of the quality of the SONET signal.

10. Method for monitoring a SONET signal comprising:

separating the signal power in a framing portion of the SONET signal from noise power in the framing portion;

comparing the noise power in the framing portion to the signal power in a data portion of the SONET signal to determine a measure of the quality of the SONET signal.

11. The method of claim 10 wherein separating the signal power in the framing portion is performed using a filter device adapted to filter out the spectral content of the framing signal of the SONET signal.

\* \* \* \* \*